(12) United States Patent
Mackness

(10) Patent No.: US 6,902,136 B2
(45) Date of Patent: Jun. 7, 2005

(54) WIRELESS LANDING GEAR MONITORING SYSTEM

(75) Inventor: Robert F. Mackness, Marysville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/736,250

(22) Filed: Dec. 15, 2003

(65) Prior Publication Data

US 2004/0124307 A1 Jul. 1, 2004

Related U.S. Application Data

(62) Division of application No. 10/273,659, filed on Oct. 18, 2002.

(51) Int. Cl.[7] ................................. B64C 25/00
(52) U.S. Cl. .................................... 244/100 R
(58) Field of Search ........................ 244/100 R, 129.5, 244/103 R, 102 R; 340/960; 324/207.2

(56) References Cited

U.S. PATENT DOCUMENTS

| | | | |
|---|---|---|---|
| 2,615,330 A | 10/1952 | Blackmon et al. | |
| 3,949,252 A | 4/1976 | Riesenberg et al. | 310/168 |
| 4,031,449 A | 6/1977 | Trombly | 320/2 |
| 4,312,042 A | 1/1982 | Bateman | 364/463 |
| 4,529,961 A | 7/1985 | Nishimura et al. | 340/58 |
| 4,782,256 A | 11/1988 | Kokubu | 310/83 |
| 5,231,391 A | 7/1993 | Rigaux | 340/448 |
| 5,673,018 A | 9/1997 | Lowe et al. | 340/445 |
| 5,850,113 A | 12/1998 | Weimer et al. | 307/125 |
| 5,955,972 A | 9/1999 | Wade | 340/960 |
| 6,158,692 A | * 12/2000 | Abild et al. | 244/129.5 |
| 6,259,991 B1 | * 7/2001 | Nysen | 701/300 |
| 6,346,881 B1 | * 2/2002 | Davidson | 340/514 |
| 6,538,426 B1 | 3/2003 | Enrietto et al. | 324/174 |

* cited by examiner

Primary Examiner—Tien Dinh
(74) Attorney, Agent, or Firm—Harness Dickey & Pierce P.L.C.

(57) ABSTRACT

A wireless landing gear monitoring system for an aircraft. The monitoring system includes a wireless, e.g. radio frequency (RF), hubcap transceiver powered by a rechargeable battery combined with a super-capacitor, all mounted to an inside surface of a wheel hubcap of the aircraft. Additionally, the system includes a permanent magnet generator (PMG) mounted to the inside surface of the hubcap that charges the battery when the wheel is rotating. The hubcap transceiver communicates with at least one distant, or remote, transceiver inside the aircraft, a tire pressure sensor mounted to a wheel rim, and a Hall-effect wheel speed transducer mounted to the hubcap. The tire pressure sensor uses an extremely low power wireless transmitter to communicate with the hubcap transceiver, which then sends wheel speed and tire pressure data to the distant transceiver.

23 Claims, 4 Drawing Sheets

WIRELESS LANDING GEAR MONITORING SYSTEM

CROSS REFERENCE TO RELATED APPLICATIONS

This application is a divisional of U.S. patent application Ser. No. 10/273,659 filed on Oct. 18, 2002. The disclosure of the above application is incorporated herein by reference.

FIELD OF INVENTION

The invention relates generally to aircraft landing gear. More specifically, the invention relates to a wireless system and method for monitoring tire pressures and wheel speeds of aircraft landing gear.

BACKGROUND OF THE INVENTION

Known systems and methods for measuring aircraft tire pressures and wheel speeds require wiring to be run from a control unit inside the aircraft down a landing gear strut and into the inside of an axle. Holes have to be made in a landing gear beam to accommodate the wiring that runs from an antiskid system and tire pressure indication system mounted inside the axle to the control unit. This wiring is costly, weight intensive, adds complexity to the installation of the monitoring systems, and can make a significant contribution to aerodynamic noise and drag.

In addition to the problems presented by the wiring, known systems often have difficulty transmitting signals across a rotating interface between the stationary axle and a revolving wheel. For example, to transmit power to, and data from, a tire pressure sensor mounted in a wheel rim, known designs utilize mechanical couplings between a hubcap and an axle-mounted wheel speed transducer, and between the hubcap and a mechanically driven, rotating transformer. Furthermore, known systems are prone to mechanical wear and are very sensitive to backlash that can degrade the performance of an aircraft's antiskid braking system.

Therefore, it would be desirable to eliminate the problems of known systems caused by the heavy, complex mechanical components mounted inside the aircraft axle and hubcap and the wiring running from the landing gear to the control unit. It would further be desirable to replace the present hard-wired system with a wireless system that transmits data and information from electrical components inside the aircraft hubcap to the control unit inside the aircraft.

BRIEF SUMMARY OF THE INVENTION

In one preferred embodiment of the present invention, the invention consists of a wireless aircraft landing gear monitoring system for monitoring the operational status of landing gear systems, such as wheel speed and tire pressure. The monitoring system includes a radio frequency (RF) wireless hubcap transceiver powered by a rechargeable battery combined with a super-capacitor, all mounted to the inside surface of a wheel hubcap of the aircraft. Additionally, the system includes a permanent magnet generator (PMG) mounted to the inside surface of the hubcap that charges the super-capacitor when the wheel is rotating. The super-capacitor then charges the battery. The hubcap transceiver communicates with at least one distant, or remote, transceiver located inside the aircraft, a tire pressure sensor mounted to a wheel rim, and a non-contacting wheel speed transducer, such as a Hall-effect transducer, mounted to the hubcap. The tire pressure sensor uses an extremely low power RF transmitter to communicate with the hubcap transceiver, which then sends wheel speed and tire pressure data to the distant transceiver.

In another preferred embodiment of the present invention, a method is provided for monitoring the operational status of aircraft landing gear systems, for example wheel speed and tire pressure. The method includes using the rotation of an aircraft wheel to drive a PMG mounted to an inside surface of a hubcap of a landing gear wheel and operating at least one wheel assembly component, mounted to the inside surface of the hubcap, using a current output by the PMG. Additionally, the method includes communicating landing gear system operational status data, provided by the wheel assembly component, to at least one distant transceiver using RF signals transmitted by a hubcap transceiver.

In yet another preferred embodiment of the present invention, an aircraft landing gear is provided that includes at least one wheel, a hubcap coupled to the wheel, and a wireless landing gear monitoring system for monitoring the operational status of the landing gear systems, such as wheel speed and tire pressure. The wireless landing gear monitoring system comprises a plurality of wheel assembly components. At least one wheel assembly component is mounted to an inside surface of the hubcap. The wheel assembly components include a radio frequency (RF) wireless hubcap transceiver mounted to the hubcap and a wheel speed sensor also mounted to the hubcap. The hubcap transceiver is adapted to utilize RF signals to communicate with a remote transceiver, and the wheel speed sensor is adapted to monitor wheel rotational speed. Additionally, the wheel assembly components include a PMG mounted to the hubcap that is adapted to utilize rotation of the wheel to generate current output to a power supply mounted to the hubcap. The power supply is adapted to utilize the current generated by the PMG and provide power to the hubcap transceiver and the wheel speed sensor. Furthermore, the wheel assembly components include a tire pressure sensor mounted to the wheel and adapted to monitor air pressure in a tire mounted on the wheel.

BRIEF DESCRIPTION OF THE DRAWINGS

The present invention will become more fully understood from the detailed description and accompanying drawings, wherein;

FIG. 2a is a front view schematic of a permanent magnet generator (PMG) included in the hubcap shown in FIG. 1;

FIG. 2b is a side view schematic of the PMG shown in FIG. 2a;

DETAILED DESCRIPTION OF THE INVENTION

Figure 1:
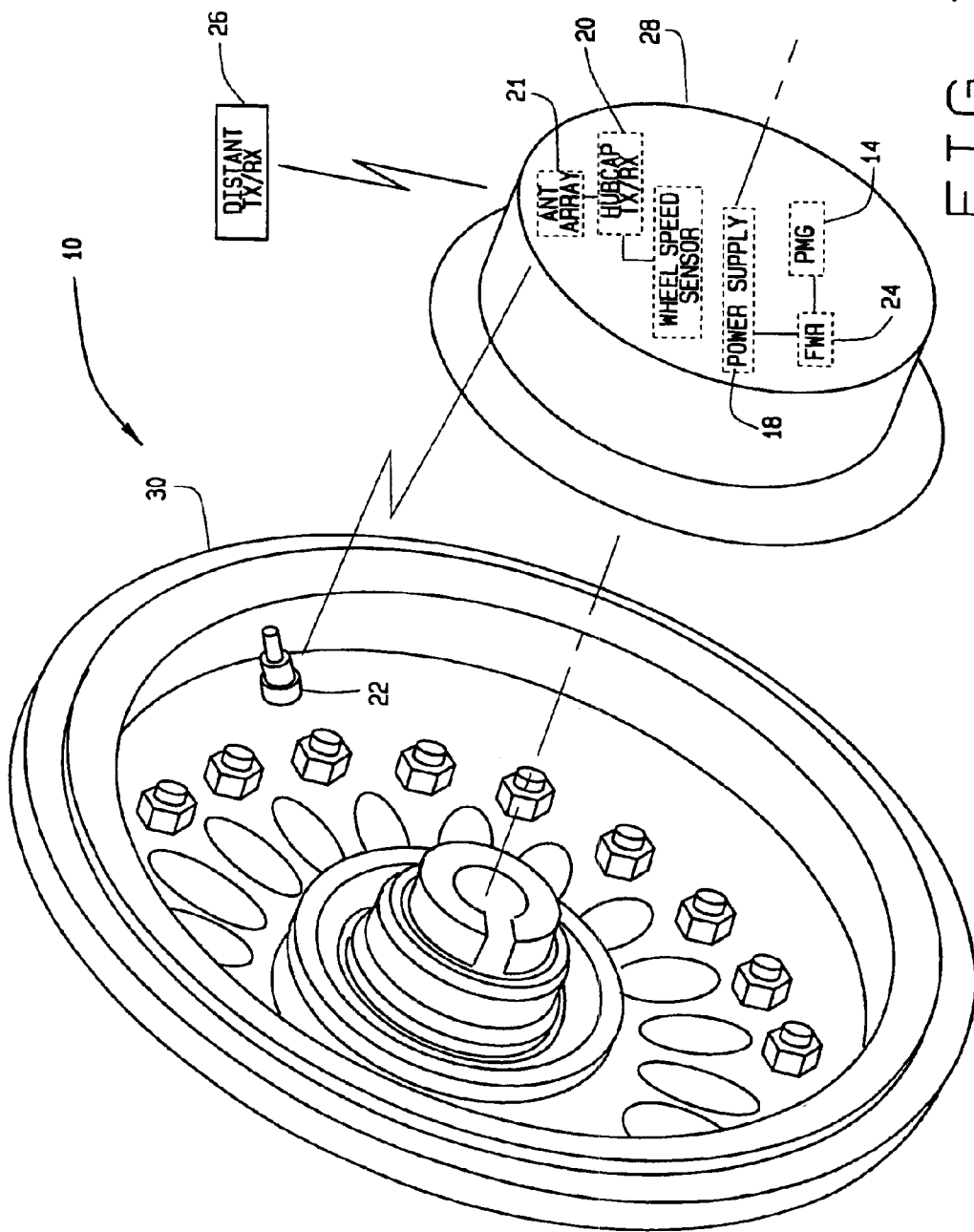
FIG. 1 is a simplified perspective view of a wireless aircraft landing gear monitoring system.

FIG. 1 is a schematic of a wireless aircraft landing gear monitoring system 10 in accordance with a preferred embodiment of the present invention. System 10 is used to monitor the operational status of landing gear systems. For example, monitoring system 10 is used to monitor landing gear wheel speed and tire pressure. However, it will be appreciated that while system 10 is ideally suited for aircraft landing gear, system 10 could be adapted for use with wheel assemblies of virtually any mobile platform, and is therefore not limited to use with only aircraft.

The components of monitoring system 10 include a permanent magnet generator (PMG) 14, a wheel speed sensor, or transducer, 16, a power supply 18, a radio frequency (RF) hubcap transceiver 20, an antenna array 21, a tire pressure sensor 22, a full wave rectifier (FWR) 24, and a distant (i.e. remote) transceiver 26. PMG 14, wheel speed sensor 16, power supply 18, RF hubcap transceiver 20, tire pressure sensor 22, and FWR 24 are sometimes referred to herein as wheel assembly components of monitoring system 10. PMG 14, wheel speed sensor 16, power supply 18, RF hubcap transceiver 20, antenna array 21, and FWR 24 are mounted on an inner surface (not shown) of a wheel hubcap 28 that is removably attachable to a wheel 30 of the aircraft landing gear. Tire pressure sensor 22 is mounted on wheel 30 and wirelessly communicates with RF hubcap transceiver 20. In a preferred embodiment, each wheel of a main landing gear (not shown) and a nose landing gear (not shown) of the aircraft includes a hubcap 28 and wheel assembly components of monitoring system 10 mounted as described above. Distant transceiver 26 is located on or inside the aircraft, as described below.

In an alternative preferred embodiment, the wheel assembly components can include other monitoring devices and sensors adapted to monitor other landing gear systems such as wheel torque and brake temperatures.

Figures 2A, 2B:
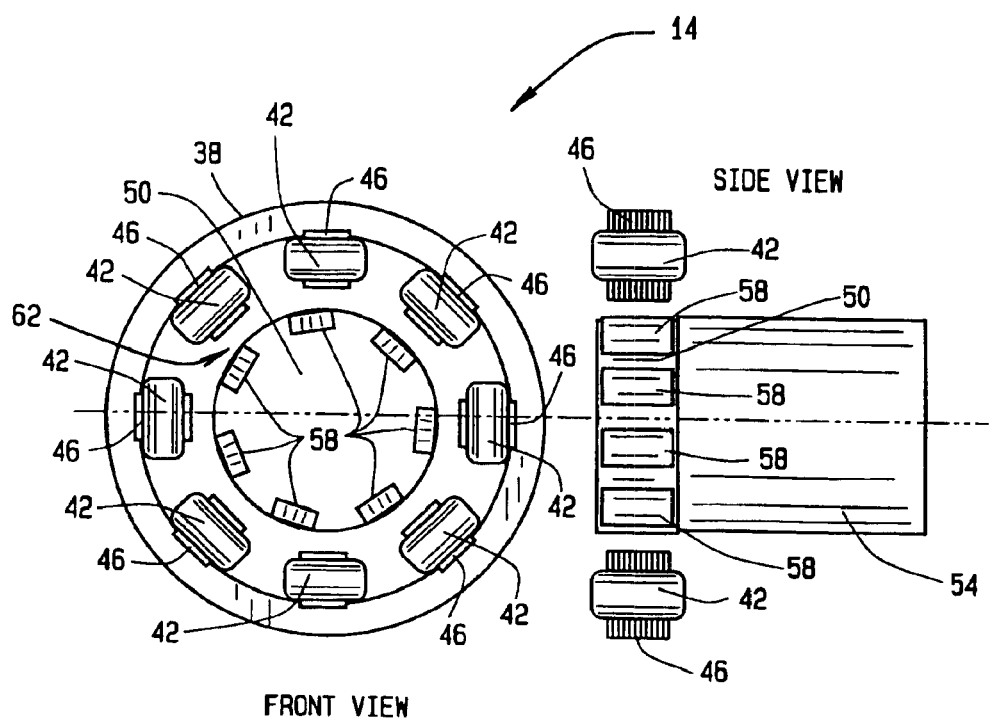

FIGS. 2a and 2b are schematics of the PMG 14. PMG 14 includes a rotor assembly 38 mounted to hubcap 28 (shown in FIG. 1). Rotor assembly 38 includes a plurality of magnet wire coils 42 wound on a plurality of laminated steel cores 46. Additionally, PMG 14 includes a stator assembly 50 mounted on the outboard end of the wheel axle 54. Stator assembly 50 includes a plurality of permanent magnets 58. As the aircraft wheel rotates about axle 54, coils 42 rotate about magnets 58 thereby exciting coils 42 such that a current is induced into coils 42. The amplitude and frequency of the induced current are a function of the speed at which the wheel 30 is rotating. A radial clearance, or air gap, 62 between rotor assembly 38 and stator assembly 50 is sufficient to accommodate a run-out that results from manufacturing tolerances. Full wave rectifier 24 mounted (shown in FIG. 1) rectifies the alternating current and outputs the rectified current to power supply 18.

Figure 3:
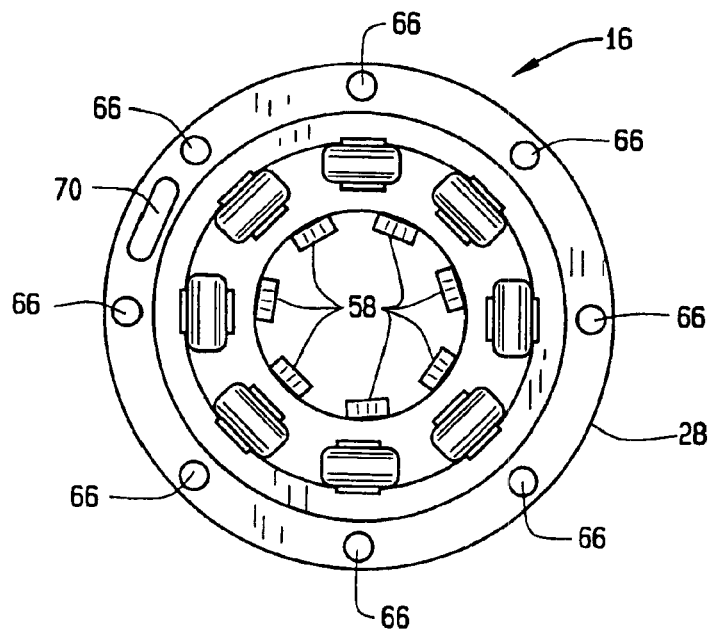
FIG. 3 is a schematic of a wheel speed sensor included in the hubcap shown in FIG. 1.

FIG. 3 is a schematic of the wheel speed sensor 16. In a preferred embodiment, wheel speed sensor 16 utilizes a plurality of Hall effect devices 66 that are mounted to the inside surface of hubcap 28 outboard of rotor assembly 38 of PMG 14 (shown in FIG. 2). The Hall effect devices 66 sense the position of stator magnets 58 and provide wheel position information to a wheel speed circuit 70. Wheel speed circuit 70 converts the Hall effect information to a digital signal that corresponds to wheel speed. In an alternative embodiment, wheel speed sensor 16 can be any suitable speed sensing device, such as a mechanical tachometer.

Figure 4:
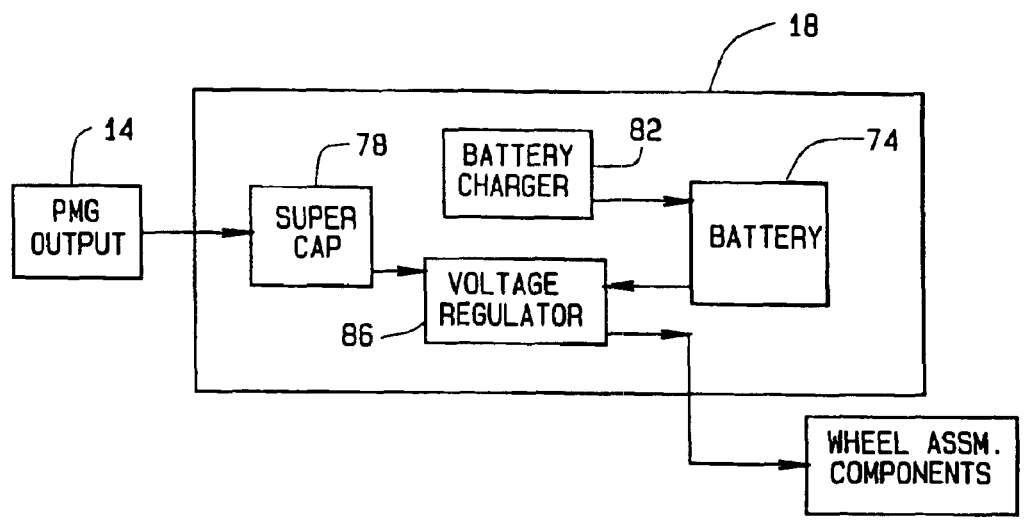
FIG. 4 is a schematic of a power supply of the system included in the hubcap shown in FIG. 1.

FIG. 4 is a schematic of the power supply 18. Power supply 18 includes a rechargeable battery 74, a super-capacitor 78, a charging circuit 82, and a voltage regulator 86. Battery 74 can be any type of suitable rechargeable battery, for example a Nickel Metal Hydride (LiMH) battery. Power supply 18 utilizes the rectified current produced by PMG 14 and FWR 24 to charge battery 82 and super-capacitor 78. Super-capacitor 78 is capable of being charged very quickly after a few revolutions of the wheel.

In normal operation, voltage regulator 86 uses the energy stored in battery 74 to power the other wheel assembly components of monitoring system 10, e.g. wheel speed sensor 16, tire pressure sensor 22, and hubcap transceiver 20 (shown in FIG. 1). However, when battery 74 voltage is low, voltage regulator 86 uses energy stored in super-capacitor 78. In this case, super-capacitor 78 provides energy to voltage regulator 86, whereby voltage regulator 86 provides a regulated source of voltage to battery charger 82 and the other wheel assembly components within hubcap 28. Therefore, power is provided to the other wheel assembly components of monitoring system 10 during cold temperatures when battery 82 may be frozen or when battery 82 is otherwise inoperative.

Figure 5:
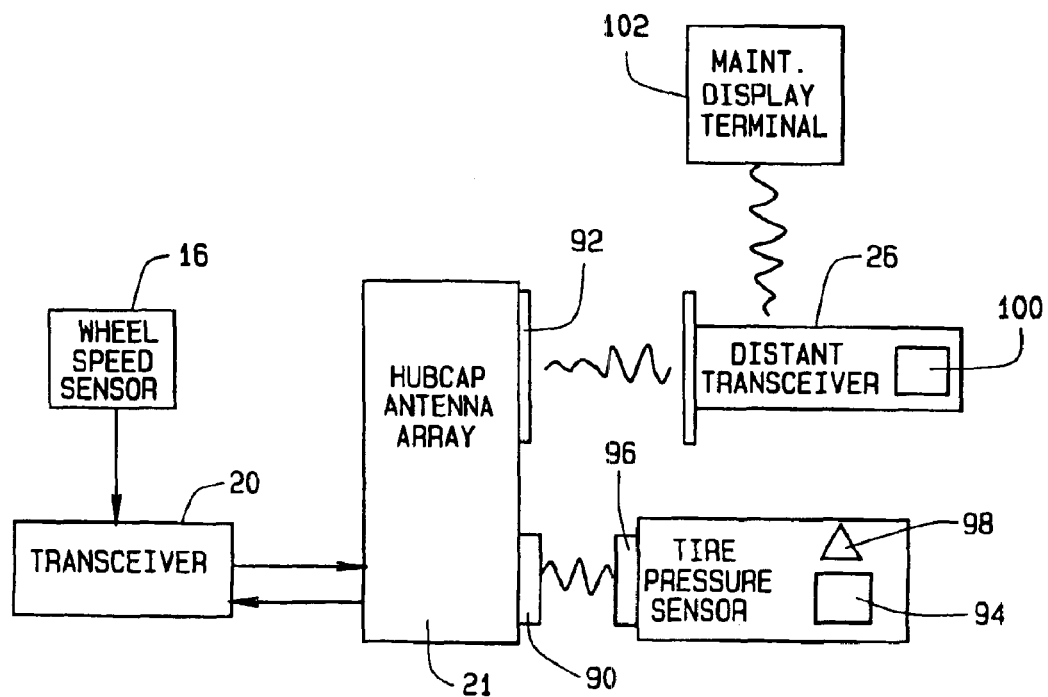
FIG. 5 is a schematic demonstrating the functionality of a radio frequency hubcap transceiver included in the hubcap shown in FIG. 1.

FIG. 5 is a schematic demonstrating the functionality of the RF hubcap transceiver 20. Antenna array 21 is mounted to the inside surface of hubcap 28 (shown in FIG. 1) and connected to RF hubcap transceiver 20. Antenna array 21 includes a first, close-coupled antenna 90 that receives information from tire pressure sensor 22. Additionally, antenna array 21 includes a longer-range antenna 92 utilized to transmit and receive information to and from at least one of a plurality of distant transceivers 26 located inside the aircraft.

Preferably, RF hubcap transceiver 20 utilizes a carrier wave broadcast by any one of distant transceivers 26 as a power source for transmissions. Alternatively, RF hubcap transceiver 20 may use a storage battery to provide the power for transmitting data to the distant transceiver. RF hubcap transceiver 20 transmits wheel speed information any time the wheel 30 is rotating. In addition, hubcap transceiver 20 includes a random number generator (not shown) that times an interval between transmissions such that the probability of two hubcap transceivers 20 broadcasting simultaneously to the same distant transceiver 26 is substantially eliminated. Furthermore, RF hubcap transceiver 20 transmits data relating to the operational fitness of the wheel assembly components and tire pressure when such data is requested by one of the distant transceivers 26.

As described further below in reference to FIG. 6, data transmissions from RF hubcap transceiver 20 include a marker signal that uniquely identifies the respective hubcap 28 in which it is installed. That is, the marker signal identifies the specific landing gear and the specific wheel within that landing gear from which the respective RF hubcap transceiver 20 is transmitting. For example, the marker signal may indicate that a signal being received by a distant transceiver 26 is being transmitted by the RF hubcap transceiver 20 located in the hubcap of a number two wheel of the nose landing gear. In one preferred embodiment, the signal from RF hubcap transceiver 20 can be blocked by a hand held shield made of an appropriate material, such as Mu metal, to provide a maintenance technician with a simple method of identifying a hubcap position to the distant transceiver 26.

With further reference to FIG. 5, tire pressure sensor 22 includes a pressure sensing circuit 94 and a second close-coupled RF transmitter 96. In a preferred embodiment, tire pressure sensor 22 uses the carrier wave of RF hubcap transmitter 20 as an energy source to provide power for transmitting tire pressure data. Additionally, tire pressure sensor 22 stores the energy received from RF hubcap transceiver 20 for use by pressure sensing circuit 94 using a super-capacitor 98. In an alternate preferred embodiment, tire pressure sensor 22 utilizes power stored in a chemical storage battery (not shown) included in tire pressure sensor 22. In another preferred embodiment, tire pressure sensor 22 utilizes power from a battery (not shown) mounted in hubcap 28. Power is transferred from the battery to tire pressure sensor 22 via a wire harness. In this embodiment, tire pressure sensor 22 sends data to the hubcap transceiver 20 by transmitting a signal over the wire harness.

Preferably, each aircraft is equipped with at least two distant transceivers 26 to provide redundancy of certain functions. Distant transceivers 26 operate using power from an aircraft electrical power supply (not shown) and communicate with all RF hubcap transceivers 20 using a RF signal. Additionally, distant transceivers 26 communicate with other systems on the aircraft including a flight deck display system (not shown), on-board maintenance system (not shown), and other wireless aircraft devices over a serial data bus. Each distant transceiver 26 includes a non-volatile memory device 100 for storing the identity of each hubcap assigned to it and the position of that hubcap on the aircraft. Memory device 100 also stores a back-up record of the identities and positions of the other hubcaps on the aircraft so that such information can be provided to another distant transceiver 26 in which the respective memory device 100 has failed. For example, if the memory device 118 in a first distant transceiver 26 fails, a second distant transceiver 26 will provide a copy of the needed data and information from its respective memory device 100 upon request by the first distant transceiver 26.

Each distant transceiver 26 controls the operation of all the associated landing gear monitoring systems 10 such that the power consumed by each monitoring system 10 is minimized. When another system onboard the aircraft requests landing gear systems information, the distant transceiver 26 receiving the request immediately communicates with the monitoring system 10 of the specific wheel for which the information is requested and responds to the request. At other times, each distant transceiver 26 communicates with its associated monitoring system 10 at a regular, longer time interval such that warnings of anomalous tire pressures or monitoring system 10 failures are provided. When the aircraft wheels are rotating, each distant transceiver 26 communicates with its associated monitoring systems 26 at a RF frequency that will not interfere with communications of a brake control system for the aircraft.

Figure 6:
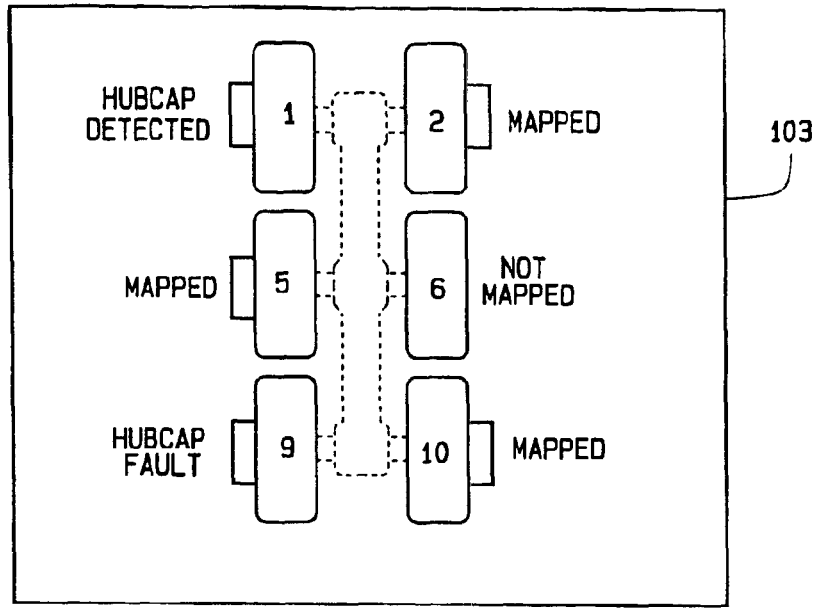
FIG. 6 is a graphical representation of a mapping screen displayed on a maintenance display terminal shown in FIG. 5.

FIG. 6 is a graphical representation 103 of a mapping screen displayed on a maintenance display terminal 102 (shown in FIG. 5). Maintenance display terminal 102 may be a computer based device including a monitor, a processor, a data storage device, and at least one input/output device, e.g. a mouse or keyboard. Maintenance display terminal 102 can be a stationary device located inside the aircraft or a portable or hand held device capable of being transported from one location to another, for example a portable maintenance access terminal (PMAT).

Each distant transceiver 26 is adapted to communicate with maintenance display terminal 102 where a mapping of the monitoring systems 10 for each landing gear is displayed. The mapping identifies the wheel hubcap 28 of the landing gear to which each specific monitoring system 10 is mounted. The hubcap transceiver 20 of each monitoring system 10 transmits an independent RF signal having a signal characteristic specific to that monitoring system 10. The signal characteristic could be any suitable RF signal characteristic that would be unique to the signal transmitted by given monitoring system 10. For example, each signal could have a designated frequency and/or wavelength, or each signal could include a radio frequency ID (RFID) tag. These independent signal characteristics are referred to as marker signals and are used to identify and map the location of each monitoring system 10 mounted to the inside surface of each hubcap 28 of each landing gear of the aircraft.

Figure 7:
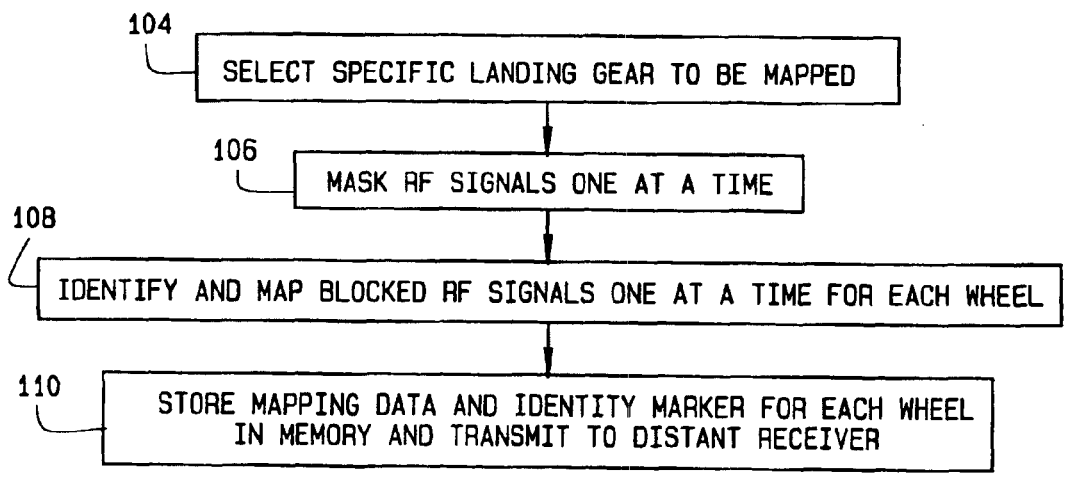
FIG. 7 is a simplified flow chart of the steps performed by the present invention during operation.

When a first technician activates a mapping command at maintenance display terminal 102, a mapping program, shown in FIG. 7, is executed by the display terminal 102 and prompts the first technician to select a specific landing gear to be mapped, as indicated at step 104. The distant transceiver 26 will then wait for each monitoring system 10 of the selected landing gear to be masked, as indicated at step 106. In a preferred embodiment, masking is performed by blocking the RF signals being transmitted by all the RF hubcap transceivers of the selected landing gear one at a time. The blocked signal is then identified by the distant transceiver 26 and mapped to a specific monitoring system 10 for a specific wheel of the selected landing gear, as indicated at step 108. This process is repeated until the entire landing gear is mapped.

For example, after the first technician activates the mapping command and selects a landing gear, a second technician is directed to mask, or block, the signal from a specific hubcap transceiver 20 of a designated wheel, e.g. wheel number one. The signal can be blocked in any suitable manner, e.g. placing a metal shield over the hubcap 28 of wheel number one. The distant transceiver 26 then identifies which signal is no longer being received and transmits information to the maintenance display terminal 102 indicating that the signal from wheel number one has been detected, as indicated in FIG. 6. Distant transceiver 26 continues to transmit this identification signal to display terminal 102 until a confirmation is received from the first technician, via the maintenance display terminal 102. Once the confirmation has been made, maintenance display 102 indicates that the monitoring system 10 for the designated wheel has been mapped, as indicated in FIG. 6 at wheels two, five and ten. This process is repeated until all the monitoring systems 10 have been mapped. Prior to a monitoring system 10 of a specific wheel being mapped, maintenance display terminal will indicate the monitoring system 10 for that wheel has not been mapped, as shown in FIG. 6 at wheel six. Additionally, if the mapping of a monitoring system 10 for a specific wheel fails for any reason, maintenance display terminal will indicate there is a hubcap fault, as shown in FIG. 6 at wheel nine.

As confirmation is received for each monitoring system 10, the distant transceiver 26 stores the mapping data and identity marker of the hubcap 28 in its non-volatile memory device 100 and transmits a copy of the memory contents to at least one redundant distant transceiver 26, as indicated at step 110. Therefore, if a distant transceiver 26 is replaced, the new distant transceiver 26 can be commanded to retrieve a map of its assigned monitoring systems 10 and respective hubcaps 28 from the redundant distant transceivers 26.

Alternatively, the RF signal transmitted from each monitoring system 10 can be disrupted, for the purposes of mapping each monitoring system 10, using a permanent magnet. A permanent magnet can be placed in a specific location on one of the hubcaps 28 of the monitoring system 10 selected to be mapped, where it is held in place by a ferrous metal target. The resulting magnetization of the target activates an electrical switch, such as a magnetic reed switch or a Hall-effect switch, which causes a hubcap circuit to send a special test marker to hubcap transceiver 20. The test marker is recognized by distant transceiver 26 as coming from one of the hubcaps 28 waiting to be mapped. This technique allows a technician to perform the mapping process independently, without assistance from another technician.

It is envisioned that any suitable means of changing the nature of the RF signal transmitted by each hubcap transceiver 20 can be utilized to map the geographical location of each monitoring system 10. For example, a hand held wand that radiates a RF signal could be placed by each hubcap 28 to disrupt the signal transmitted by the hubcap transceiver 20, or a signal could be added to the signal transmitted by the hubcap transceiver 20, thereby changing the nature of the signal.

The present invention thus provides a system for wirelessly communicating important information from various wheel sensors to a remote transceiver on a mobile platform, and mapping the signals to monitor important operating parameters of the wheel assembly. The present invention provides the advantage of significantly reducing aerodynamic noise and drag typically associated with wiring routed to the wheel assemblies of an aircraft landing gear subassembly that is typically used to communicate such information.

While the invention has been described in terms of various specific embodiments, those skilled in the art will recognize that the invention can be practiced with modification within the spirit and scope of the claims.

What is claimed is:

1. A method for monitoring a performance characteristic of a wheel of a mobile platform, the method comprising:
    using rotation of the wheel during operation of the mobile platform to impart motion to an electric current generating device being carried on the wheel, to thus generate an electric current;
    using said electric current to power a wheel performance characteristic sensor, that in turn senses a wheel performance characteristic and provides a real time signal indicative of the wheel performance characteristic;
    communicating said signal via wireless signals to a receiver located on the mobile platform remotely from the wheel; and
    using said wireless signals to communicate to said receiver mapping information and an identity marker used to specifically identify a positional location of said wheel within a larger plurality of said wheels, by disrupting the wireless signal.

2. The method of claim 1, wherein using rotation of the wheel to impart motion to an electric current generating device comprises using rotation of the wheel to impart motion to a permanent magnet generator supported on a hubcap associated with the wheel.

3. The method of claim 1, wherein communicating information specifically identifying said wheel comprises communicating information identifying a position of said wheel to thus associate said position of said wheel with said wheel performance characteristic.

4. The method of claim 1, further comprising storing the information identifying said wheel in said receiver.

5. The method of claim 1, further comprising storing the information identifying said wheel on a device in communication with said receiver.

6. The method of claim 1, further comprising displaying the wheel performance characteristic on a display viewable by an operator of the mobile platform.

7. The method of claim 1, further comprising displaying the information identifying said wheel and said wheel performance characteristic on a display viewable by an operator of the mobile platform.

8. A method for mapping and monitoring aircraft landing gear systems, said method comprising:
    using the rotation of a subject aircraft landing gear wheel to drive a permanent magnet generator (PMG) mounted to a hubcap coupled to the subject landing gear wheel;
    operating a wheel speed sensor, mounted to the hubcap, using a current output by the PMG;
    communicating subject landing gear wheel rotational speed data, provided by the wheel speed sensor, to at least one remotely located transceiver using wireless signals;
    acquiring mapping data and an identity marker used to identify a positional location of the subject landing gear wheel with respect to other landing gear wheels within the landing gear by disrupting the wireless signal communicated to the remotely located transceiver; and
    storing the mapping data and the identity marker in the remotely located transceiver.

9. The method of claim 8, wherein operating the wheel speed sensor using the current from the PMG comprises:
    inputting the current output by the PMG to a power supply mounted to the hubcap; and
    providing power output by the power supply to the wheel speed sensor and a hubcap transceiver mounted to the hubcap.

10. The method of claim 9 wherein providing power comprises utilizing power stored in at least one of a supercapacitor included in the power supply and a battery included in the power supply.

11. The method of claim 9, wherein communicating subject landing gear wheel rotational speed data comprises:
    communicating subject landing gear wheel speed data provided by the wheel speed sensor to the hubcap transceiver; and
    using wireless signals to transmit the subject landing gear wheel speed data from the hubcap transceiver to the remotely located transceiver.

12. The method of claim 9, wherein said method further comprises:
    communicating subject tire pressure data, provided by a tire pressure sensor mounted to the subject landing gear wheel, to the hubcap transceiver; and
    using wireless signals to transmit the subject tire pressure data from the hubcap transceiver to the remotely located transceiver.

13. The method of claim 12, wherein communicating subject tire pressure data comprises operating the tire pressure sensor using as a power source at least one of a carrier wave transmitted by the hubcap transceiver and a battery included in the tire pressure sensor.

14. The method of claim 8, wherein the method further comprises:
    displaying a schematic illustrating all the landing gear wheels on a maintenance display terminal, and;
    showing the positional location of the subject landing gear wheel within the illustrated schematic.

15. The method of claim 8, wherein the method further comprises displaying the subject landing gear wheel rotational speed data on a maintenance display terminal.

16. A method for mapping a location within an aircraft landing gear for each of a plurality of wireless landing gear monitoring systems, said method comprising:

mounting a hubcap transceiver included in each monitoring system to a respective one of a plurality of landing gear wheel hubcaps;

transmitting a wireless signal including a marker signal from the hubcap transceiver to at least one of a plurality of distant transceivers coupled to the aircraft;

acquiring mapping data pertaining to a positional location of at least one of the hubcap transceivers by activating a mapping command utilizing a maintenance display terminal, using the maintenance display terminal to select a specific landing gear monitoring system to be mapped and disrupting the wireless signal transmitted from the hubcap transceiver of the landing gear monitoring system selected to be mapped; and displaying the mapping data on the maintenance display terminal such that the positional location of the hubcap transceiver is illustrated.

17. The method of claim 16, wherein disrupting the wireless signal includes blocking the transmission of the wireless signal to the distant transceiver.

18. The method of claim 16, wherein acquiring mapping data further includes identifying the disrupted wireless signal using the distant transceiver.

19. The method of claim 18, wherein acquiring mapping data further includes correlating the identified disrupted wireless signal and associated marker signal to the landing gear monitoring system selected to be mapped and storing data expressing the correlation in the distant transceiver.

20. The method of claim 19, wherein acquiring mapping data further includes transmitting the correlation data from the distant transceiver to the maintenance display terminal.

21. The method of claim 20 wherein acquiring mapping data further includes transmitting the correlation data from the distant transceiver to at least one other distant transceiver and storing the information in the other distant transceiver.

22. The method of claim 16, wherein the method further includes monitoring the operational status of the landing gear wheel associated with the selected monitoring system, via the maintenance display terminal.

23. A method for mapping a location within an aircraft landing gear for each of a plurality of wireless landing gear monitoring systems, wherein each monitoring system is carried on a respective one of a plurality of landing gear wheel hubcaps, said method comprising:

transmitting a wireless signal including a marker signal from a hubcap transceiver included in each monitoring system to at least one of a plurality of remote transceivers coupled to the aircraft, wherein each marker signal contains a signal characteristic unique to the respective monitoring system from which it is transmitted;

activating a mapping command at a maintenance display terminal adapted to communicate with each remote transceiver;

selecting, using the maintenance display terminal, a specific landing gear monitoring system to be mapped;

disrupting the wireless signal transmitted from the hubcap transceiver of the landing gear monitoring system selected to be mapped;

identifying the disrupted wireless signal using the remote transceiver;

correlating the identified disrupted wireless signal and associated marker signal to the landing gear monitoring system selected to be mapped and storing data expressing the correlation in the remote transceiver;

transmitting the correlation data from the remote transceiver to the maintenance display terminal;

transmitting the correlation data from the remote transceiver to at least one other remote transceiver and storing the information in the other remote transceiver; and monitoring the operational status of the landing gear wheel associated with the selected monitoring system, via the maintenance display terminal.

\* \* \* \* \*